US009535506B2

(12) United States Patent
Raffa et al.

(10) Patent No.: US 9,535,506 B2
(45) Date of Patent: Jan. 3, 2017

(54) EFFICIENT GESTURE PROCESSING

(71) Applicants: Giuseppe Raffa, Portland, OR (US); Lama Nachman, Santa Clara, CA (US); Jinwon Lee, Daejeon (KR)

(72) Inventors: Giuseppe Raffa, Portland, OR (US); Lama Nachman, Santa Clara, CA (US); Jinwon Lee, Daejeon (KR)

(73) Assignee: Intel Corporation, Santa Clara, CA (US)

(*) Notice: Subject to any disclaimer, the term of this patent is extended or adjusted under 35 U.S.C. 154(b) by 424 days.

(21) Appl. No.: 14/205,210

(22) Filed: Mar. 11, 2014

(65) Prior Publication Data

US 2014/0191955 A1    Jul. 10, 2014

Related U.S. Application Data

(62) Division of application No. 12/835,079, filed on Jul. 13, 2010, now abandoned.

(51) Int. Cl.
| | | |
|---|---|---|
| *G06F 1/16* | (2006.01) | |
| *G06F 3/01* | (2006.01) | |
| *G06F 3/0346* | (2013.01) | |

(52) U.S. Cl.
CPC ............ *G06F 3/017* (2013.01); *G06F 1/1694* (2013.01); *G06F 3/0346* (2013.01); *H04M 2250/12* (2013.01)

(58) Field of Classification Search
CPC ...... G06F 3/017; G06F 1/1694; G06F 3/0346; H04M 2250/12
See application file for complete search history.

(56) References Cited

U.S. PATENT DOCUMENTS 6,072,494 A     6/2000 Nguyen
6,304,674 B1 * 10/2001 Cass ...................... G06K 9/222
                                                      382/103

(Continued)

FOREIGN PATENT DOCUMENTS

EP          2336842          6/2011

OTHER PUBLICATIONS

A Framework for Hand Gesture Recognition with Applications to Sign Language, by Bhuyan, published 2006.*

(Continued)

*Primary Examiner* — Stanley K Hill
*Assistant Examiner* — Thomas Fink
(74) *Attorney, Agent, or Firm* — Blakely, Sokoloff, Taylor & Zafman LLP

(57) ABSTRACT

Embodiments of the invention describe a system to efficiently execute gesture recognition algorithms. Embodiments of the invention describe a power efficient staged gesture recognition pipeline including multimodal interaction detection, context based optimized recognition, and context based optimized training and continuous learning. Embodiments of the invention further describe a system to accommodate many types of algorithms depending on the type of gesture that is needed in any particular situation. Examples of recognition algorithms include but are not limited to, HMM for complex dynamic gestures (e.g. write a number in the air), Decision Trees (DT) for static poses, peak detection for coarse shake/whack gestures or inertial methods (INS) for pitch/roll detection.

18 Claims, 6 Drawing Sheets

(56) References Cited

U.S. PATENT DOCUMENTS

| | | |
|---|---|---|
| 6,990,639 B2 | 1/2006 | Wilson |
| 2002/0190947 A1 | 12/2002 | Feinstein |
| 2004/0068409 A1* | 4/2004 | Tanaka .................. B25J 9/1656 |
| | | 704/272 |
| 2004/0169674 A1 | 9/2004 | Linjama |
| 2004/0193413 A1 | 9/2004 | Wilson et al. |
| 2005/0210419 A1 | 9/2005 | Kela et al. |
| 2005/0278559 A1* | 12/2005 | Sutardja ................ G06F 1/3203 |
| | | 713/320 |
| 2006/0256082 A1 | 11/2006 | Cho et al. |
| 2008/0192005 A1* | 8/2008 | Elgoyhen ................ G06F 3/014 |
| | | 345/158 |
| 2008/0259042 A1 | 10/2008 | Thorn |
| 2009/0265671 A1* | 10/2009 | Sachs ...................... G06F 3/017 |
| | | 715/863 |
| 2010/0060576 A1 | 3/2010 | Underkoffler et al. |
| 2010/0111358 A1 | 5/2010 | Chai et al. |
| 2010/0287470 A1 | 11/2010 | Homma et al. |
| 2010/0315337 A1 | 12/2010 | Ferren et al. |
| 2010/0315356 A1 | 12/2010 | Ferren et al. |
| 2011/0148915 A1 | 6/2011 | Kim |
| 2011/0234492 A1* | 9/2011 | Ajmera ................... G06F 3/017 |
| | | 345/158 |
| 2012/0016641 A1 | 1/2012 | Raffa et al. |

OTHER PUBLICATIONS

Fast and Accurate 3D Gesture Recognition Interface, by Segen, published 1998.*

European Search Report for EP Counterpart Application No. 11873104.1, 9 pgs., (Apr. 14, 2015).

Office Action counterpart Chinese Patent Application No. 201180034400.9, mailed Mar. 9, 2015, 8 pages.

* cited by examiner

EFFICIENT GESTURE PROCESSING

CROSS-REFERENCE TO RELATED APPLICATIONS

This application is a divisional application of, and claims priority from, U.S. patent application Ser. No. 12/835,079, filed on Jul. 13, 2010, which is incorporated by reference as if fully set forth herein.

FIELD

Embodiments of the invention generally pertain to electronic devices, and more particularly, to gesture recognition systems.

BACKGROUND

Gesture interfaces based on inertial sensors such as accelerometers and gyroscopes embedded in small form factor devices (e.g. a sensor-enabled handheld device or wristwatch) are becoming increasingly common in user devices such as smart phones, remote controllers and game consoles.

In the mobile space, gesture interaction is an attractive alternative to traditional interfaces because it does not contain the shrinking of the form factor of traditional input devices such as a keyboard and mouse and screen. In addition, gesture interaction is more supportive of mobility, as users can easily do subtle gestures as they walk around or drive.

"Dynamic 3D gestures" are based on atomic movements of a user using inertial sensors such as micro-electromechanical system (MEMS) based accelerometers and gyroscopes. Statistical recognition algorithms, such as Hidden Markov Model algorithms (HMM), are widely used for gesture and speech recognition and many other machine learning tasks. Research has shown HMM to be extremely effective for recognizing complex gestures and enabling rich gesture input vocabularies.

Several challenges arise when using HMM for gesture recognition in mobile devices. HMM is computationally demanding (e.g., $O(num\_of\_samples*HMM\_num\_states^2)$). Furthermore, to obtain highly accurate results, continuous Gaussian Mixtures are usually employed in HMM's output probabilities, whose probability density function evaluation is computationally expensive. Matching an incoming signal with several models (typically one per trained gesture) for finding the best match (e.g. using Viterbi decoding in HMM) is also computationally intensive.

Low latency requirements of mobile devices pose a problem in real time gesture recognition on resource constrained devices, especially when using techniques for improving accuracy, e.g. changing gesture "grammar" or statistical models on the fly.

Additionally, for a high level of usability, gestures should be easy to use. Common techniques based on push/release buttons for gesture spotting should be avoided. Inexact interaction based only on shake/whack gestures limits the user experience. Finally, using a simple and easily recognizable gesture to trigger gesture recognition would be cumbersome in complex and sustained gesture-based user interactions.

A straight forward approach to mitigate these issues would be to run continuous HMM (CHMM) for gesture spotting and recognition. However this will trigger many false positives and is not efficient with regards to power consumption and processing.

Current gesture interfaces also typically choose one single algorithm to recognize all the gestures, based on the type of expected user gestures. For example, dynamic movement tracking is typically employed by smart-phone applications, while continuous tracking may be used in motion detection gaming consoles. Thus, gesture recognition devices are typically configured to recognize and process only a specific type of gesture.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1A:
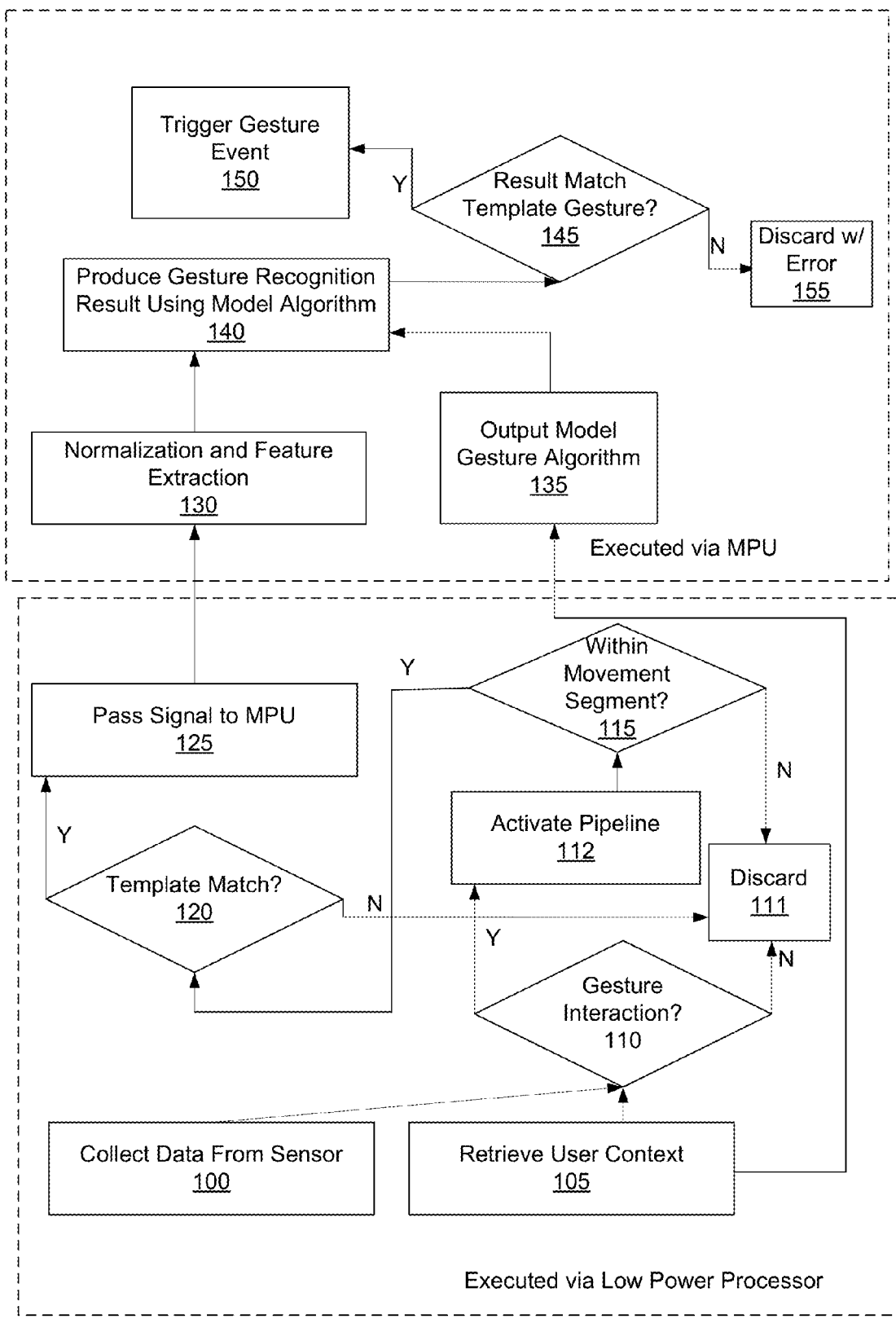
FIG. 1A is a flow diagram of a process utilizing an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe a system to efficiently execute gesture recognition algorithms. Embodiments of the invention further describe a system to accommodate many types of algorithms depending on the type of gesture that is needed in any particular situation. Examples of recognition algorithms include but are not limited to, HMM for complex dynamic gestures (e.g. write a number in the air), Decision Trees (DT) for static poses, peak detection for coarse shake/whack gestures or inertial methods (INS) for pitch/roll detection.

Statistical recognition algorithms, such as Hidden Markov Model algorithms (HMM), are widely used for gesture and speech recognition and many other machine learning tasks. These algorithms tend to be resource (e.g., computational resources, bandwidth) intensive. Continuously running HMM algorithms is inefficient in most gesture recognition scenarios, where significant portions of sensor data captured are not related to gesture movements. Furthermore, continuously running gesture recognition algorithms may trigger false positives for non-gesture movements made while using a device (e.g., a user's hand movements while having a conversation are typically not done to signal a device to execute a command).

Solutions to reduce the resource use of gesture recognition algorithms include scaling down the implementation of these algorithms; however this also leads to a reduction in gesture recognition accuracy and thus eliminates the possibility of allowing the user to employ a rich gesture vocabulary with a device.

Other solutions allow processing for a static (i.e., pre-determined) set of gestures that are used as vocabulary during gesture training and recognition. This solution eliminates the possibility of a rich mobile experience by not allowing the use of different gestures at different times (e.g. in different contexts or locations or activities).

To provide for efficient gesture recognition in devices, without the effect of limiting possible gesture inputs, embodiments of the invention describe a power efficient staged gesture recognition pipeline including multimodal interaction detection, context based optimized recognition, and context based optimized training and continuous learning.

It is to be understood that designing a gesture recognition system using a pipeline of computational stages, each stage of increasing complexity, improves the computation and power efficiency of the system. In one embodiment, low-accuracy low-computation stages are executed via a low-power sensing unit (LPSU) continuously analyzing a device sensor's data stream. LPSU may be physically attached to a main mobile device (e.g. a sensor subsystem) or included in a peripheral device (e.g. a wrist watch) and wirelessly connected. When a possible gesture-like signal is coarsely recognized, an event can wake up a main processor unit (MPU) to perform computationally intensive stages (e.g. feature extraction, normalization and statistical analysis of the data stream using HMM).

Embodiments of the invention may further reduce unnecessary invocations of gesture recognition algorithms by leveraging user context as well as simple/easy-to-detect gestures to determine time periods in which gesture interaction may be performed by the user. For example, if a phone call comes in to a mobile device utilizing an embodiment of the invention, specific gestures may be enabled to "reject", "answer", or "transfer" the call. In another embodiment, if the user is in physical proximity of a friend, gestures will be enabled to "send" and "receive" contact information. Simple/easy-to-detect gestures (such as a "shake") may also be used as a signaling mechanism for starting gesture recognition of enabled gestures.

In one embodiment, as gesture interaction is confirmed and relative context is detected, gesture recognition models may be loaded based only on enabled gestures. It is to be understood that selectively loading specific gesture recognition models diminishes false positives, as it enables only a subset of the available gestures and not an entire input vocabulary. In addition, a filler model for rejecting spurious gestures may be constructed and based on the gestures not used, enhancing the precision of the system. Real time requirements may not allow a filler model to be generated on the fly, thus the needed filler model may be pre-compiled in advance according to the possible contexts of use. As the number of gestures is finite, all the possible combinations of gestures may be potentially pre-compiled as filler models. If only a subset of combinations is used for specific context-based interactions (e.g. two specific sets of gestures for phone calls and social interactions), only those specific combinations will be used to pre-compile the needed filler models.

A gesture recognition system implementing an embodiment of the invention may further utilize context and activity information, if available in the system, to optimize training and recognition. Algorithms such as HMM typically rely on annotated training samples in order to generate the models with well-known algorithms (such as Baum-Welch). Gestures are heavily dependent on several factors such as user posture, movement noise and physical activity. Differences in those factors are hard to eliminate by using only mathematical or statistical tools. Thus, for improving the performances for gesture recognition algorithms, embodiments of the invention may further utilize a "tag" for each gesture's training sample. These tags may identify not only with the type of gesture (e.g. "EarTouch") but also with the activity in which it has been performed (e.g. "in train" or "walking"). In this way, the training procedure will produce a separate model for each gesture/activity pair instead of each gesture. During the recognition phase, the context information will be used to choose the correct gesture/activity models in the same way as in training mode.

In another embodiment of the invention, an easy-to-use continuous learning module is used to collect enough data in order to make a system's HMM models reliable and to account for a user's gesture changes over time. The continuous learning module may employ a two-gestures confirm/ignore notification. For example, right after a gesture is performed, the user may indicate that the gesture is suitable to be included in the training set (or not) by performing simple always detectable gestures (e.g. two poses of the hand or whack gestures). Hence the new training sample data along with the detected activity are used to create new gesture/activity models or enhance existing ones.

Thus, by employing a staged pipeline gesture recognition process, and leveraging user context, gesture recognition may be performed with a high degree of accuracy in a power efficient manner.

FIG. 1A is a flow diagram of a process utilizing an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Data is collected from at least one sensor (e.g., a 3D accelerometer or gyroscope), 100. In one embodiment, the sensor is separate from a mobile processing device, and communicates the data via wireless protocols known in the art (e.g., WiFi, Bluetooth). In another embodiment, the sensor is included in the mobile processing device. In this embodiment, the data from the sensor indicates a motion from a user.

User context may also be retrieved from the mobile device, 105. User context may identify, for example, an application the mobile device is running or location of the device/user. The user device may then access a database that associates context and activity information inputs with the gestures that may be allowed in any point in time and which algorithms may be used to detect these gestures. Thus, user context is used as a filter for enabling a subset of gestures (e.g. "Eartouch" when a mobile device is executing a phone application). The user activity may further enable the choice of the right models during recognition (e.g. the "Eartouch" model that is tagged with "walking" as activity). The frequency of context and activity updates may be relatively low, as it corresponds with the user's context change events in daily life.

The entire gesture recognition processing pipeline may be enabled, 112, when it is determined that one or more gestures may be performed given the user context (e.g., the user is using the mobile device as a phone, and thus gestures are disabled), and/or a simple/easy-to-detect gesture (e.g. a shake of a wristwatch or a whack gesture on the device) has been performed by the user, 110. Otherwise, sensor data is discarded, 111. A Finite State Automata can be programmed with the desired behavior.

Embodiments of the invention may further perform a segmentation of the sensor data in intervals based on the energy levels of the data, 115. This segmentation may be "button-less" in that no user input is required to segment the sensor data into a "movement window." Proper hysteresis may be used to smooth out high frequency variation of energy value. As an example, energy may be measured using evaluating a sensor's standard deviation on a moving window. Data occurring outside the "movement window" is discarded, 111, while data performed within the movement window is subsequently processed.

An entire data segment may be subsequently processed. In one embodiment, a low-computation Template Matching is executed by comparing characteristics of the current stream to be analyzed (e.g. signal duration, overall energy, minimum and maximum values for signal duration and energy levels) to a single template obtained from all training samples of "allowed gestures", 120. In this way, for example, abnormally long or low-energy gestures will be discarded in the beginning of the pipeline without running computationally expensive HMM algorithms on an MPU.

In one embodiment, "allowed gestures" are further based on training samples and "tags" for each training sample identifying the appropriate user context for the gesture. For example, a user may be executing an application (e.g., a game) that only enables specific "shake" type gestures. Therefore, movements that do not exhibit similar signal characteristics (i.e., high maximum energy values) are discarded, as these movements are not enabled given the user context.

It is to be understood that decisions 110, 115 and 120 may be determined via low-complex algorithms as described in the examples above, and that operations 100-120 may be performed by a low power processing unit. Thus, embodiments of the invention may enable continuous sensor data processing while duty-cycling the main processor. If the current signal matches at least one of the templates then the gesture's signal is "passed" to the main processing unit (waking up the main processor if necessary), 125. Otherwise, the signal is discarded, 111. Thus, the workload associated with gesture recognition processing is balanced between a low power processing unit and main processor.

Figure 1B:
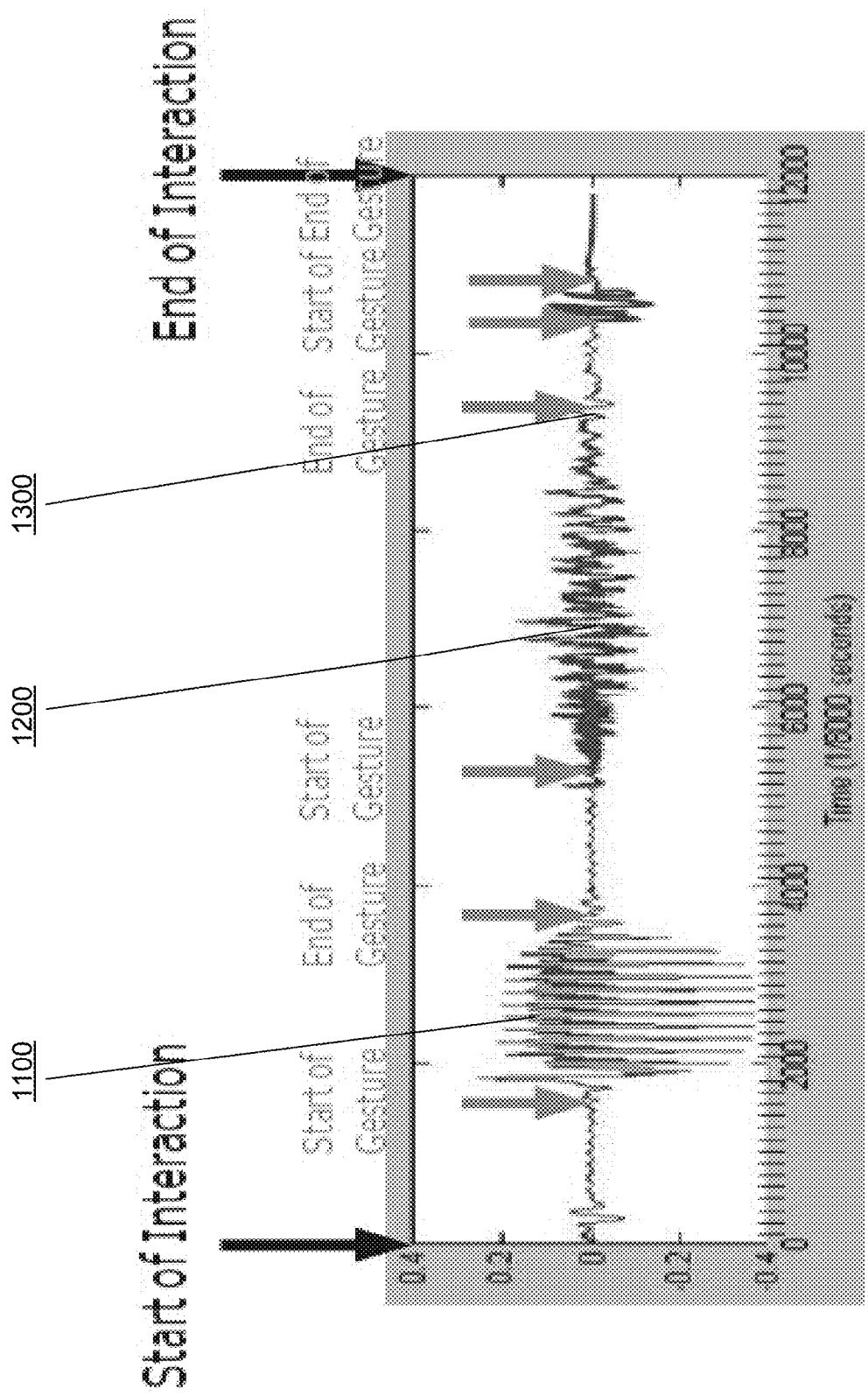
FIG. 1B is an example sensor data stream.

FIG. 1B is an example sensor data stream. Assuming user context allows for gestures (as described in operation 110), interaction 1000 is segmented into three data segments (as described in operation 115)—potential gestures 1100, 1200 and 1300. In this example, potential gesture 1200 is abnormally long and thus discarded (as described in operation 120). Potential gestures 1100 and 1300 are passed to the MPU providing they match an allowed gesture template (as described in operation 125).

Returning to FIG. 1A, Normalization and Feature extraction may be performed on the passed gesture signal, if needed by the appropriate gesture algorithm (e.g., HMM) 130. In another embodiment, this operation may also be performed via an LPSU if the computation requirements allow. Normalization procedures may include, for example, re-sampling, amplitude normalization and average removal (for accelerometer) for tilt correction. Filtering may include, for example, an Exponential Moving Average low-pass filtering.

Embodiments of the invention may further take as input the user context from 105 and produce as output a model gesture data set, 135. For example, to enable button-less interaction, one model for each allowed gesture plus a Filler model for filtering out spurious gestures not in the input vocabulary may be provided. If context is not available, all the gestures will be allowed in the current HMM "grammar".

Similarly to speech recognition, Filler models may be constructed utilizing the entire sample set or "garbage" gestures that are not in the set of recognized gestures. An embodiment may utilize only the "not allowed" gestures (that is, the entire gesture vocabulary minus the allowed gesture) to create a Filler model that is optimized for a particular situation (it is optimized because it does not contain the allowed gestures). For example, if the entire gesture set is A-Z gestures and one particular interaction allows only A-D gestures, than E-Z gestures will be used to build the Filler model. Training a Filler model in real time may be not feasible if a system has a low latency requirement, hence the set of possible contexts may be enumerated and the associated Filler models pre-computed and stored. If not possible (e.g. all gestures are possible), a default Filler model may be used.

In one embodiment of the invention, a gesture recognition result is produced from the sensor data using the model gesture and Filler algorithms, 140. Template Matching may further be performed in order to further alleviate false positives on gestures performed by the user but that are not in the current input vocabulary of allowed gestures, 145. Similar to operation 120, processing will be executed to match the recognized gesture's data stream measurements (e.g. duration, energy) against the stored Template of the candidate gesture (obtained from training data) and not on the entire set of allowed gestures as in operation 120. If the candidate gesture's measurements match the Template, a gesture event is triggered to an upper layer system (e.g., an Operating System (OS)), 150. Otherwise, the gesture is discarded, 155. In one embodiment, it is assumed a rejection during this portion of processing (i.e., MPU processing) indicates the user was attempting to in fact gesture an input command to the system; therefore, the user is notified of the rejection of said gesture.

Embodiments of the invention may further enable support of multiple gesture detection algorithms. Systems may require support for multiple gesture algorithms because a single gesture recognition algorithm may not be adequately accurate across different types of gestures. For example, gestures may be clustered into multiple types including dynamic gestures (e.g. write a letter in the air), static poses (e.g. hold your hand face up) and shake/whack gestures. For each of these gesture types, there are specific recognition algorithms that work best for that type. Thus, a mechanism is needed to select the appropriate algorithm. To run all algorithms in parallel and, based on some metric, select the "best output" is clearly not computationally efficient, especially with algorithms like HMM which tend to be computationally intensive. Therefore, embodiments of the invention may incorporate a selector system to preselect an appropriate gesture recognition algorithm in real-time based on features of the sensor data and the user's context. The selector system may include a two-stage recognizer selector that decides which algorithm may run at any given time based on signal characteristics.

The first stage may perform a best-effort selection of one or more algorithms based on signal characteristics that can be measured before the complete gesture's raw data segment is available. For example it can base its selection on the instantaneous energy magnitude, spikes in the signal or time duration of the signal. The first stage may compare these features against a template matching database and enable the algorithms whose training gestures' signal characteristics match the input signal's characteristics.

When enabled, each algorithm identifies candidate gestures in the raw data stream. In general, a gesture's data stream is shorter than the entire period of time the algorithm has been enabled; furthermore, the algorithm may identify multiple gestures (i.e. multiple "shakes" gestures or a series of poses) in the entire time window. Each enabled algorithm may perform an internal segmentation of the raw data stream by determining gestures' end points (e.g. HMM) or finding specific patterns in the signal (e.g. peak detection). Therefore some signal characteristics (such as its spectral characteristic or total energy content) may be analyzed only after a gesture has been tentatively recognized and its associated data stream is available.

In subsequent processing, the second stage may analyze the data streams associated with each candidate gesture, compare calculated features (e.g., spectral content, energy content) against a Template Matching database and choose the best match among the algorithms, providing as output the recognized gesture.

Figure 2:
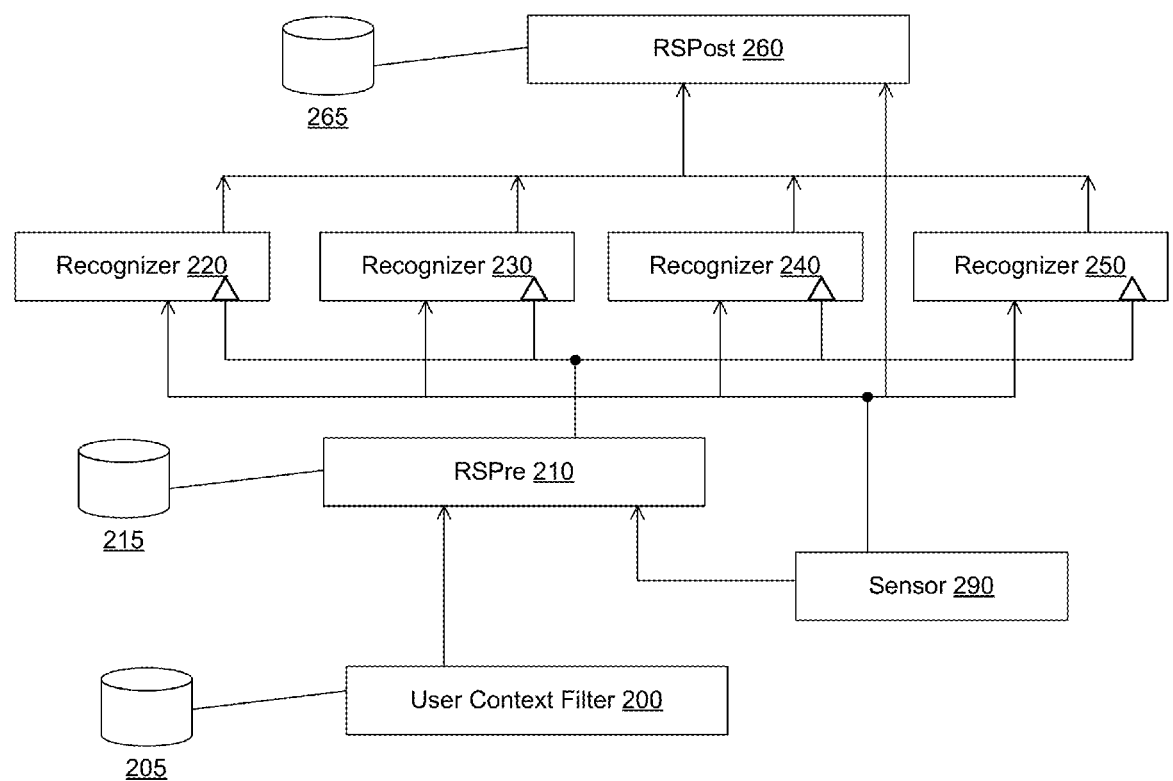
FIG. 2 is a block diagram of an embodiment of the invention.

FIG. 2 is a block diagram of an embodiment of the invention. RSPre 210, upstream with respect to the Gesture Recognizers 220-250, is fed in real time by a raw data stream of sensor 290. RSPre enables one or more of Gesture Recognizers 220-250 based on measures obtained from the raw signals of sensor 290 and allowed algorithms based on the user context. In one embodiment, User Context Filter (UCF) 200 retrieves algorithms mapped to context via database 205. Templates of signals for any algorithm may be obtained from Template Matching Database 215 and a Template Matching procedure may be performed; hence only the subset of Gesture Recognizers 220-250 that match the signal characteristics coming in will be enabled. In one embodiment, a template matching operation will produce a similarity measure for each algorithm and the first N-best algorithms will be chosen and activated if the similarity satisfies a predefined Similarity Threshold.

User Context Filter (UCF) 200 keeps track of current user context such as location, social context and physical activity, system and applications events (e.g. a phone call comes in). UCF 200 keeps track of allowed gestures given the context and updates RSPre 210 in real time with the algorithms needed to recognize the allowed Gesture Recognizers. UCF 200 uses a Gestures-to-Algorithms Mapping database 205 that contains the unique mapping from each gesture ID to the Algorithm used. For example, gestures "0" to "9" (waving the hand in the air) may be statically mapped in database 205 to HMM (used by recognizer 220) while poses such as "hand palm down/up" may be mapped to Decision Tree (used by recognizer 230). UCF 200 is fed by external applications that inform which gestures are currently meaningful for the actual user context. For example, if a phone application is active, "0" to "9" gestures will be activated and UCF 200 will activate only HMM. The output of UCF 200 (algorithms allowed) is used by RSPre 210. This filter reduces false positives when a gesture "out of context" is being made by the user and detected by sensor 290.

RSPre 210 provides appropriate hysteresis mechanisms in order to segment the data stream from sensor 290 in meaningful segments, for example using a Finite State Automata with transitions based on the similarity of thresholds between data from sensor 290 and the templates of database 215.

RSPost 260 is downstream to Gesture Recognizers 220-250 and is fed in real time by the recognized gesture events plus the raw data stream from sensor 290. In case more than one gesture is recognized as candidate in the same time interval, RSPost 260 will perform a Template Matching (accessing templates in database 265) and will output the most probable recognized gesture. RSPost 260 provides appropriate heuristics mechanisms in order to choose a single gesture if the Template Matching outputs more than one gesture ID. For example, a similarity measure may be generated from the Template Matching algorithm for each matching algorithm and the best match will be chosen.

Database 265 contains the signal "templates" (e.g. min-max values of energy level or signal Fast Fourier Transformation (FFT) characteristics) for each of Gesture Recognizers 220-250. For example, for dynamic movements recognized by HMM the average gesture_energy may be Energy_Thresold_min<gesture_energy<Energy_Thresold_max and its FFT may have components at frequencies ~20 Hz. Shake gestures maybe detected if the energy is gesture_energy>Energy_Thresold_max and its FFT has significant components at high frequencies. Signal templates may be automatically obtained from training gestures.

Figure 3:
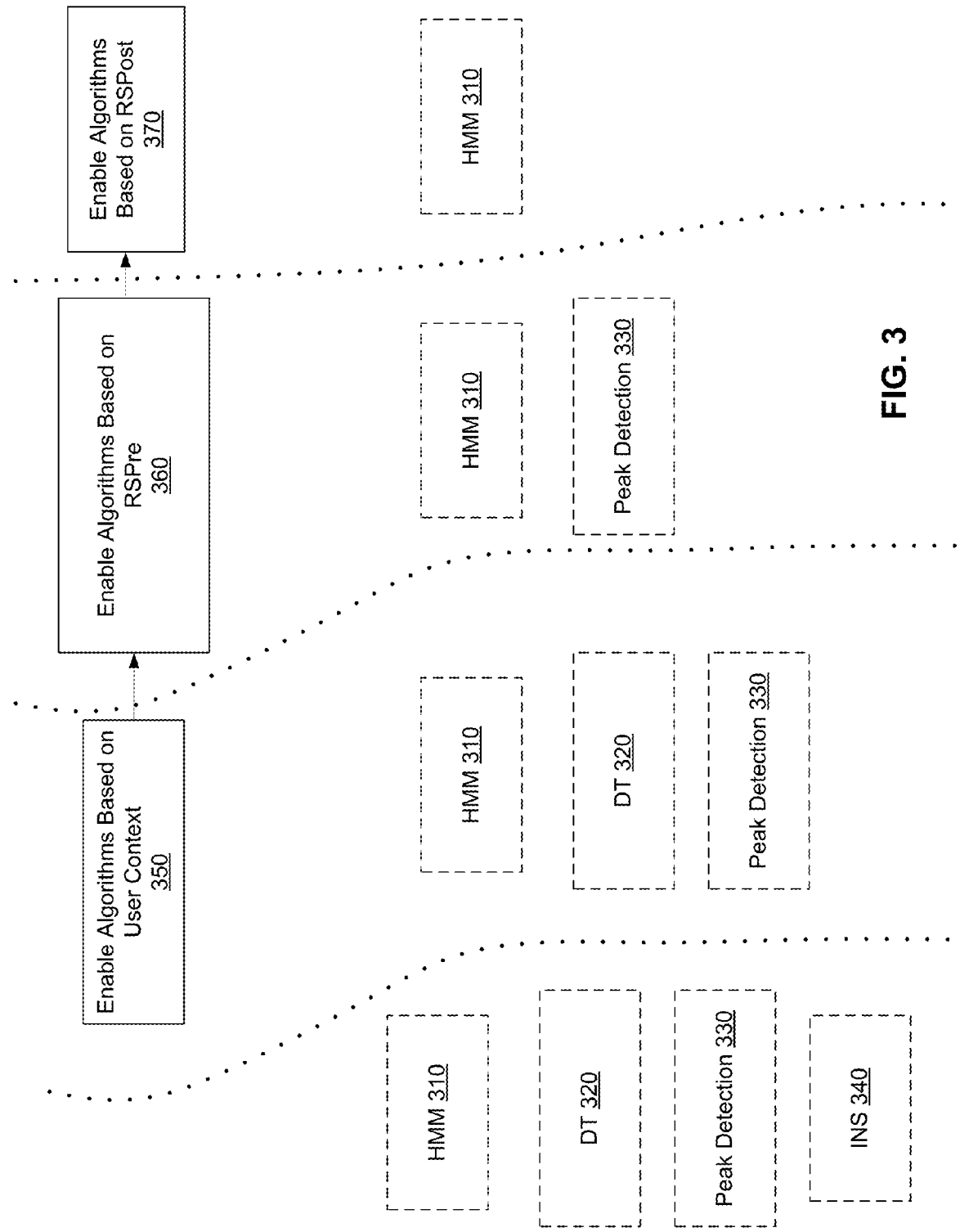
FIG. 3 is a flow diagram describing an embodiment of the invention.

FIG. 3 is a flow diagram describing an embodiment of the invention. In this example, there are four algorithms present in a system (HMM 310, Decision Trees 320, Peak Detection 330 and Pitch/Roll Inertial 340). User context is analyzed to determine suitable algorithms to consider for sensor data, 350. In this example, user context eliminates Pitch/Roll Inertial 340 from being a suitable algorithm to process any incoming signal from system sensors.

The incoming signal is analyzed (via RSPre) to enable some of the remaining algorithms present in the system, 360. In this example, RSPre enables HMM 310 and Peak Detection 320 to run. These two algorithms run in parallel and the results are analyzed, via RSPost, to determine the proper algorithm to use (if more than one is enabled via RSPre) and the gesture from the incoming signal, 370. In this example, RSPost chooses HMM 310 along with the gesture recognized by HMM. Template Matching algorithms used by RSPre and RSPost may utilize, for example, time duration, energy magnitude and frequency spectrum characteristics of sensor data. In one embodiment, RSPre analyzes the incoming signal using time duration or energy magnitude characteristics of the incoming signal, while RSPost analyzes the incoming signal using frequency spectrum characteristics of the incoming signal.

Figure 4:
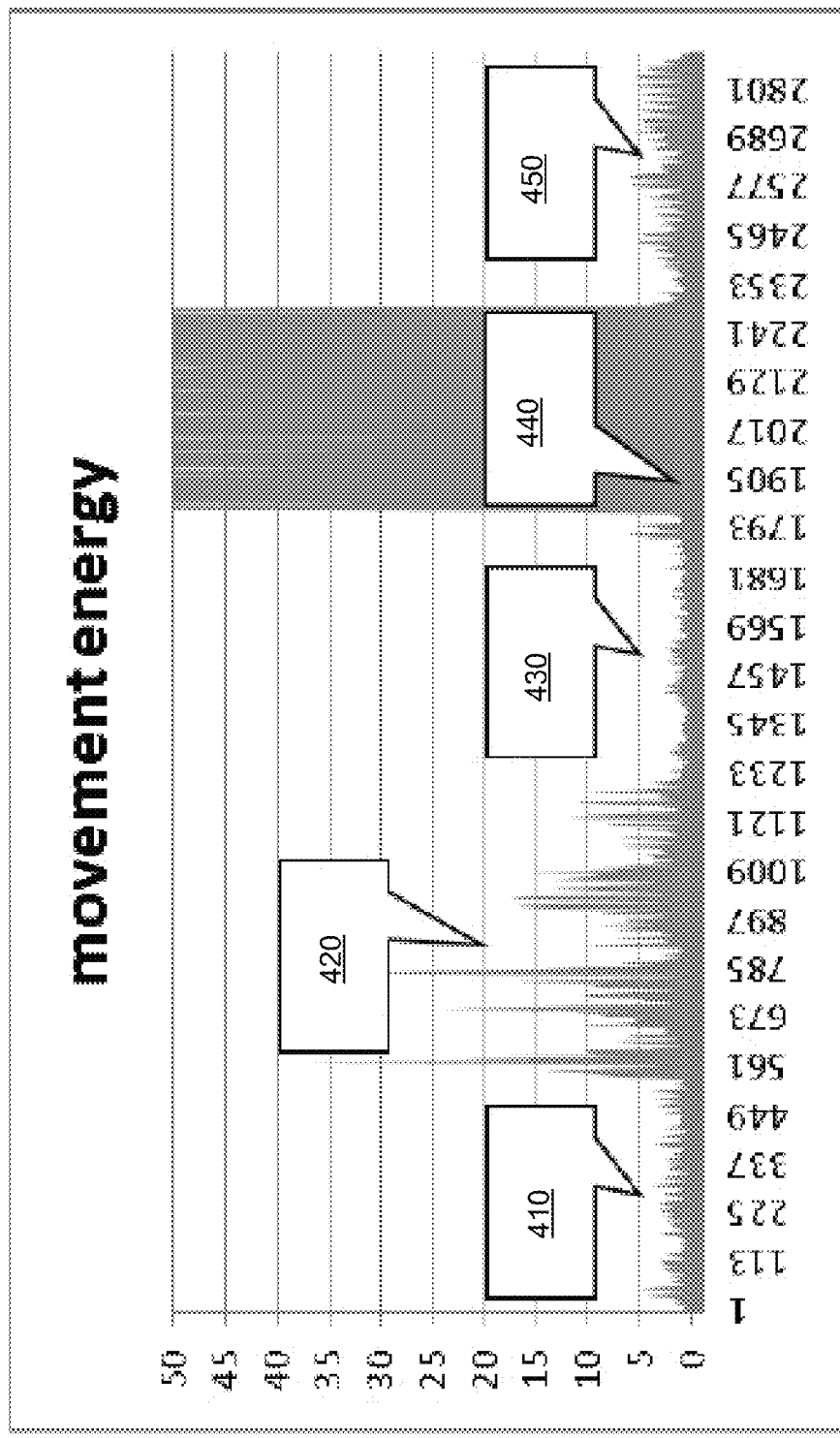
FIG. 4 is a diagram of time-domain signal characteristics that may be used by an embodiment of the invention.

FIG. 4 is a diagram of time-domain signal characteristics that may be used in the Template Matching algorithms used in RSPre and RSPost, such as running average of movement energy (here represented by Standard Deviation of the signal) or magnitude to decide whether for example a pose (segments 410, 430 and 450), dynamic gesture (segment 420) or shake (segment 440) is being performed, segmenting accordingly the data stream in stationary, dynamic or high energy intervals. In stationary intervals, for example, a Decision Tree algorithm will be enabled as the algorithm of choice for static "poses" 410, 430 and 450. For time intervals where the amplitude of the motion is above a certain threshold but less than "high energy" (e.g., segment 420), a statistical HMM algorithm will be enabled, as the state-of-the-art algorithm for dynamic gestures. For time intervals where the amplitude of the motion is "high energy" (e.g., segment 440) a Peak Detection algorithm will be enabled.

Template Matching algorithms used by RSPre and RSPost may rely, for example, on min-max comparison of features, calculated over a sliding window of the signal(s), such as mean, standard deviation and spectral components energy.

The Template Matching algorithms may be applied to each signal separately or to a combined measure derived from the signals. For example, a "movement magnitude" measure may be derived from a 3D accelerometer.

The templates may be generated using the training data. For example, all the training data for HMM-based gestures may provide the min-max values and spectral content for HMM algorithm for X, Y, Z axis and overall magnitude, if an accelerometer is used to recognize gestures.

Context may also be used to constrain the choice to a subset of the possible gestures and algorithms by indicating either allowed or disallowed gestures. For example, an application may define two different gestures recognized by two different algorithms for rejecting or accepting a call: a pose "hand palm up" for rejecting the incoming call and a movement towards the user ear for accepting the call. In this specific case, UCF will enable only the Decision Tree and the HMM as the only two algorithms needed for recognizing the allowed gestures. Accordingly, RSPre and RSPost will compute Template Matching only on this subset of algorithms.

Figure 5:
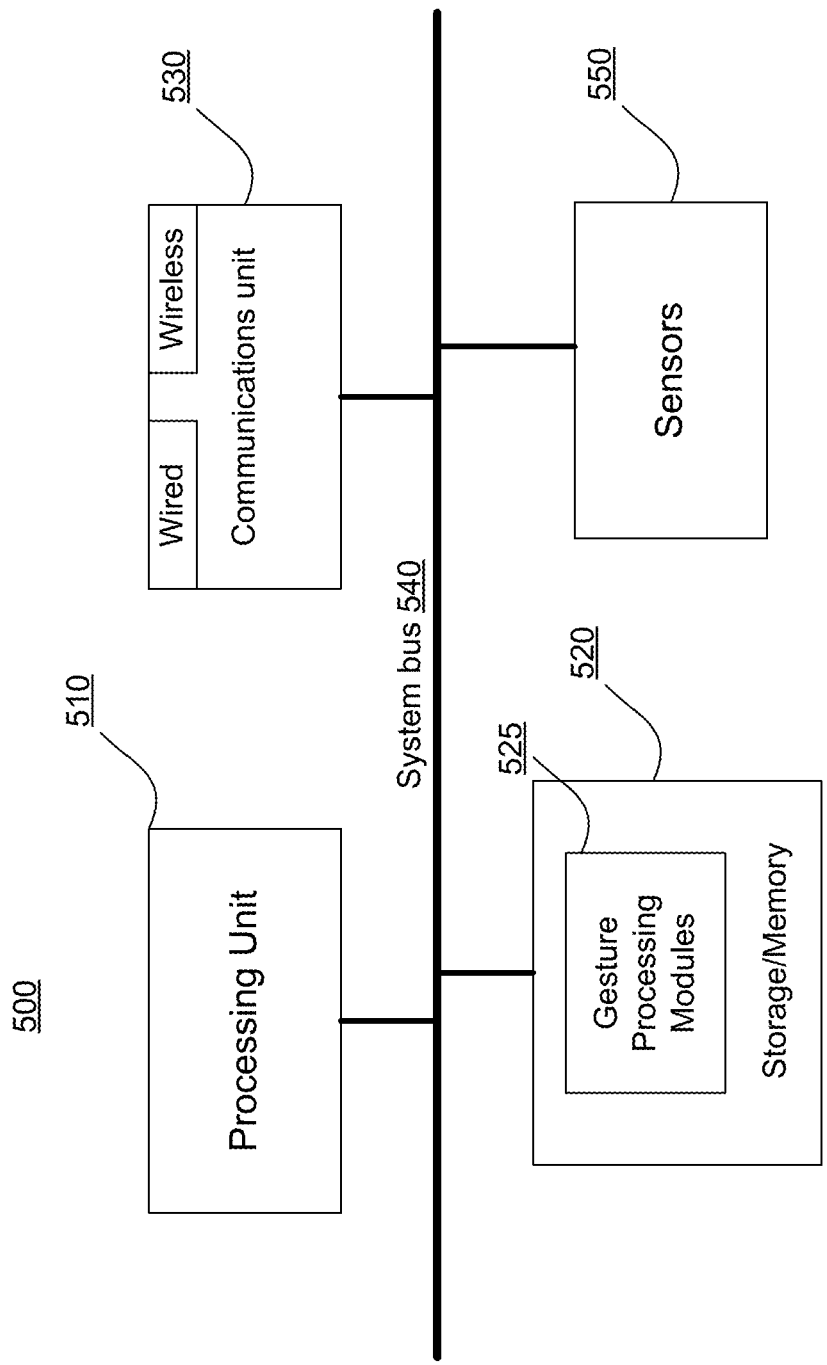
FIG. 5 is a high level architecture of a system according to one embodiment of the invention.

FIG. 5 shows a high level architecture of a system according to one embodiment of the invention. System 500 is a scalable and generic system, and is able discriminate from dynamic "high energy" gestures down to static poses. Gesture processing as described above is performed in real-time, depending on signal characteristics and user context. System 500 includes sensors 550, communication unit 530, memory 520 and processing unit 510, each of which is operatively coupled via system bus 540. It is to be understood that each components of system 500 may be included in a single or multiple devices.

In one embodiment, system 500 utilizes gesture processing modules 525 that include the functionality described above. Gesture processing modules 525 are included in a storage area of memory 520, and are executed via processing unit 510. In one embodiment, processing unit 510 includes a low-processing sub-unit and a main processing sub-unit, each to execute a specific gesture processing modules as described above.

Sensors 550 may communicate data to gesture processing modules 525 via the communications unit 530 in a wired and/or wireless manner. Examples of wired communication means may include, without limitation, a wire, cable, bus, printed circuit board (PCB), Ethernet connection, backplane, switch fabric, semiconductor material, twisted-pair wire, co-axial cable, fiber optic connection, and so forth. Examples of wireless communication means may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Sensors 550 may include any device that provides three dimensional readings (along x, y, and z axis) for measuring linear acceleration and sensor orientation (e.g., an accelerometer).

Various components referred to above as processes, servers, or tools described herein may be a means for performing the functions described. Each component described herein includes software or hardware, or a combination of these. The components can be implemented as software modules, hardware modules, special-purpose hardware (e.g., application specific hardware, ASICs, DSPs, etc.), embedded controllers, hardwired circuitry, etc. Software content (e.g., data, instructions, and configuration) may be provided via an article of manufacture including a computer storage readable medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. At least one non-transitory computer readable storage medium having instructions stored thereon that, when executed on a machine, cause the machine to:
receive data from a motion sensor;
select a subset of one or more gesture recognition algorithms from a plurality of gesture recognition algorithms based, at least in part, on an amplitude of the data;
determine an energy magnitude of the data based on the amplitude of the data; and
determine a gesture from the data based, at least in part, on applying the subset of gesture recognition algorithm(s) to the data.

2. The at least one computer readable storage medium 1, wherein the machine is to select the subset of gesture recognition algorithm(s) based, at least in part, on a comparison of a total energy magnitude of the data with a total energy magnitude value associated with each of the plurality of gesture algorithms.

3. The at least one computer readable storage medium of claim 1, wherein the machine is to select the subset of gesture recognition algorithm(s) based, at least in part, on a comparison of minimum/maximum energy magnitude values of the data with minimum/maximum energy magnitude values associated with each of the plurality of gesture algorithms.

4. The at least one computer readable storage medium of claim 1, the machine to further:
determine a frequency spectrum of the data based, at least in part, on the amplitude of the data and a phase of the data.

5. The at least one computer readable storage medium of claim 4, wherein the machine is to select the subset of gesture recognition algorithm(s) based, at least in part, on a comparison of the frequency spectrum of the data with one or more spectrum patterns associated with each of the plurality of gesture algorithms.

6. The at least one computer readable storage medium of claim 1, wherein the motion sensor comprises at least one of an accelerometer or a gyroscope.

7. A mobile computing device comprising:
a motion sensor;
a memory;
at least one processor;
an algorithm selection module, stored in the memory and executed via the at least one processor, to select a subset of one or more gesture recognition algorithms from a plurality of gesture recognition algorithms based, at least in part, on an amplitude of a data from the motion sensor and determine an energy magnitude of the data from the motion sensor based on the amplitude of the data from the motion sensor; and
a gesture recognition module, stored in the memory and executed via the at least one processor, to determine a gesture from the data from the motion sensor based, at least in part, on applying the subset of gesture recognition algorithm(s) to the data from the motion sensor.

8. The mobile computing device of claim 7, wherein the at least one processor comprises a low power processing unit to execute the algorithm selection module, and a main processing unit to execute the gesture recognition module.

9. The mobile computing device of claim 7, wherein the algorithm selection module is to select the subset of gesture recognition algorithm(s) based, at least in part, on a comparison of a total energy magnitude of the data from the motion sensor with a total energy magnitude value associated with each of the plurality of gesture algorithms.

10. The mobile computing device of claim 7, wherein the algorithm selection module is to select the subset of gesture recognition algorithm(s) based, at least in part, on a comparison of minimum/maximum energy magnitude values of the data from the motion sensor with minimum/maximum energy magnitude values associated with each of the plurality of gesture algorithms.

11. The mobile computing device of claim 7, wherein the algorithm selection module is to further:
determine a frequency spectrum of the data from the motion sensor based, at least in part, on the amplitude of the data from the motion sensor and a phase of the data from the motion sensor.

12. The mobile computing device of claim 11, wherein the algorithm selection module is to select the subset of gesture recognition algorithm(s) is based, at least in part, on a comparison of the frequency spectrum of the data from the motion sensor with one or more spectrum patterns associated with each of the plurality of gesture algorithms.

13. The mobile computing device of claim 7, wherein the motion sensor comprises an accelerometer.

14. The mobile computing device of claim 7, wherein the motion sensor comprises a gyroscope.

15. The mobile computing device of claim 7, further comprising:
a wearable housing including the motion sensor, the at least one processor, and the memory.

16. A machine-implemented method comprising:
receiving data from a motion sensor;
selecting a subset of one or more gesture recognition algorithms from a plurality of gesture recognition algorithms based, at least in part, on an amplitude of the data;
determining an energy magnitude of the data based on the amplitude of the data; and
determining a gesture from the data based, at least in part, on applying the subset of gesture recognition algorithm(s) to the data.

17. The machine-implemented method of claim 16, wherein selecting the subset of gesture recognition algorithm(s) is based, at least in part, on at least one of:
comparing a total energy magnitude of the data with a total energy magnitude value associated with each of the plurality of gesture algorithms; or
comparing minimum/maximum energy magnitude values of the data with minimum/maximum energy magnitude values associated with each of the plurality of gesture algorithms.

18. The machine-implemented method of claim 16, further comprising:
determining a frequency spectrum of the data based, at least in part, on the amplitude of the data and a phase of the data; wherein selecting the subset of gesture recognition algorithm(s) is based, at least in part, on comparing the frequency spectrum of the data with one or more spectrum patterns associated with each of the plurality of gesture algorithms.

\* \* \* \* \*